(12) United States Patent
Lee et al.

(10) Patent No.: US 12,069,458 B2
(45) Date of Patent: Aug. 20, 2024

(54) ELECTRONIC DEVICE AND METHOD FOR GENERATING AUDIO SIGNAL

(71) Applicant: SAMSUNG ELECTRONICS CO., LTD., Suwon-si (KR)

(72) Inventors: Jaehwan Lee, Suwon-si (KR); Jeonggyu Jo, Suwon-si (KR); Incheol Baek, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 223 days.

(21) Appl. No.: 17/859,221

(22) Filed: Jul. 7, 2022

(65) Prior Publication Data

US 2023/0026128 A1 Jan. 26, 2023

Related U.S. Application Data

(63) Continuation of application No. PCT/KR2022/008288, filed on Jun. 13, 2022.

(30) Foreign Application Priority Data

Jul. 16, 2021 (KR) .................. 10-2021-0093294

(51) Int. Cl.
*H04R 29/00* (2006.01)
*G06F 1/16* (2006.01)
(Continued)

(52) U.S. Cl.
CPC .......... *H04R 7/045* (2013.01); *G06F 1/1688* (2013.01); *G06F 3/011* (2013.01); *H04R 17/00* (2013.01);
(Continued)

(58) Field of Classification Search
CPC . H04R 3/04; H04R 7/04; H04R 7/045; H04R 29/001; H04R 2499/11; H04R 2499/15
See application file for complete search history.

(56) References Cited

U.S. PATENT DOCUMENTS 8,887,570 B2 11/2014 Abildgaard et al.
9,496,842 B2 11/2016 Sudo
(Continued)

FOREIGN PATENT DOCUMENTS

KR 101442341 B1 9/2014
KR 101580676 B1 1/2016
(Continued)

OTHER PUBLICATIONS

International Search Report with Written Opinion for International Application No. PCT/KR2022/008288; Application Filing Date Jun. 13, 2022; Date of Mailing Sep. 27, 2022 (9 pages).

*Primary Examiner* — Ryan Robinson

(74) *Attorney, Agent, or Firm* — CANTOR COLBURN LLP

(57) ABSTRACT

An electronic device and method for generating an audio signal is provided. According to various example embodiments, an electronic device may include a display configured to depict visual information to the outside of the electronic device. The electronic device further includes an actuator to cause the display to vibrate. A processor is electrically connected to the actuator and the display. The processor applies a pilot signal to the actuator, and detects an amount of vibration of the display caused by applying the pilot signal. The processor sets an environment of the audio signal based on the amount of vibration of the display.

20 Claims, 8 Drawing Sheets

(51) Int. Cl.
  *G06F 3/01*   (2006.01)
  *H04R 7/04*   (2006.01)
  *H04R 17/00*  (2006.01)

(52) U.S. Cl.
  CPC ...... *H04R 2400/03* (2013.01); *H04R 2499/11* (2013.01)

(56) References Cited

U.S. PATENT DOCUMENTS

| | | | |
|---|---|---|---|
| 9,781,529 B2* | 10/2017 | Tong | H04R 3/02 |
| 11,348,567 B2* | 5/2022 | Bernal Castillo | H04R 29/001 |
| 11,765,499 B2* | 9/2023 | Hendrix | G06F 3/016 |
| | | | 381/92 |
| 11,933,822 B2* | 3/2024 | Reynaga | G06F 3/016 |
| 2020/0329304 A1 | 10/2020 | Yang et al. | |
| 2021/0174777 A1* | 6/2021 | Marchais | G10K 9/13 |
| 2022/0029505 A1* | 1/2022 | Khenkin | G01R 27/2611 |

FOREIGN PATENT DOCUMENTS

| | | | | |
|---|---|---|---|---|
| KR | 20170111262 A | | 10/2017 | |
| KR | 20190091605 A | | 8/2019 | |
| KR | 20200063496 A | | 6/2020 | |
| KR | 20210011306 A | | 2/2021 | |
| WO | WO-2022234244 A1 * | | 11/2022 | ......... G01R 19/0092 |

* cited by examiner

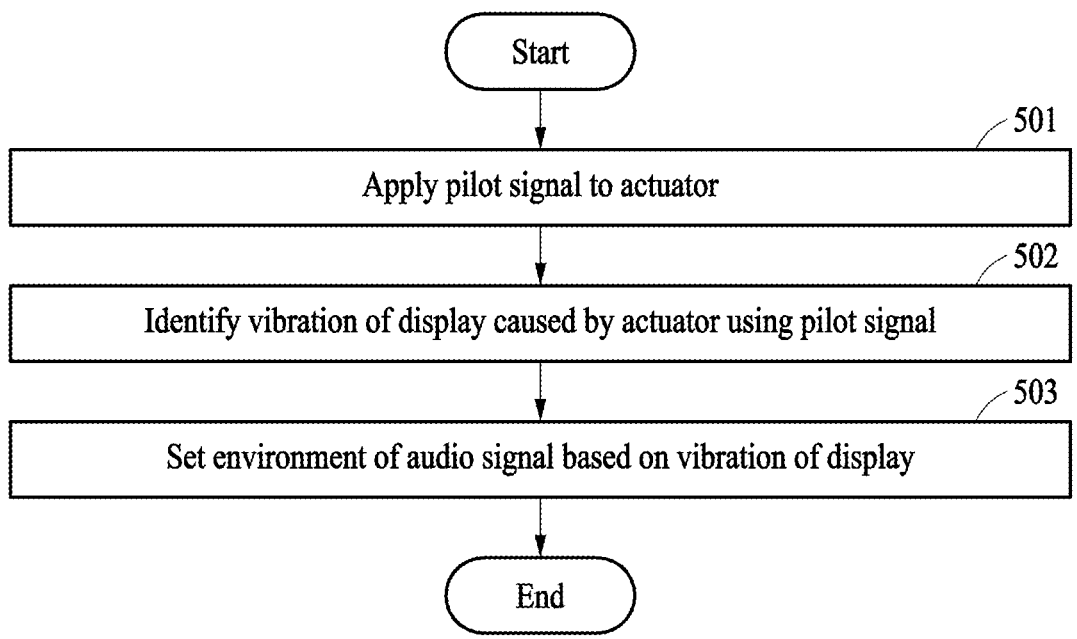
FIG. 5
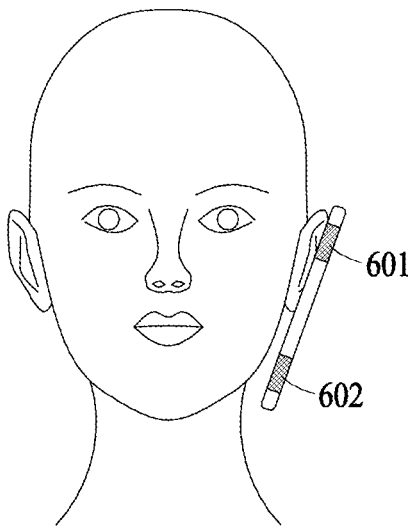 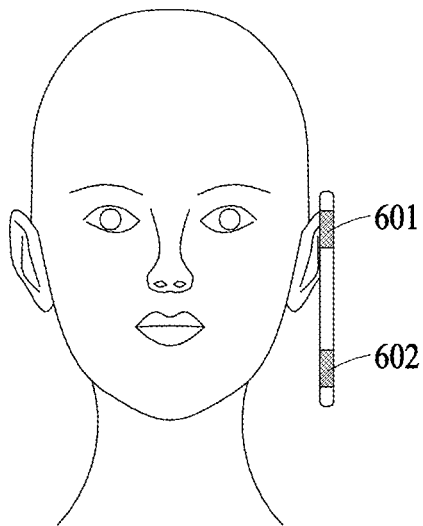
FIG. 6A  FIG. 6B

ELECTRONIC DEVICE AND METHOD FOR GENERATING AUDIO SIGNAL

CROSS-REFERENCE TO RELATED APPLICATIONS

This application is a national stage application of International Application No. PCT/KR2022/008288 designating the United States, filed on Jun. 13, 2022, at the Korean Intellectual Property Receiving Office and claiming priority to Korean Patent Application No. 10-2021-0093294, filed on Jul. 16, 2021, at the Korean Intellectual Property Office, the disclosures of which are incorporated by reference herein in their entireties.

BACKGROUND

1. Field

Various example embodiments of the present disclosure relate to an electronic device and method for generating an audio signal.

2. Description of Related Art

Recently, due to the development of wireless communication and charging technology, expansion of the wireless accessory market, design competitiveness, and development of cloud technology, portless electronic devices (e.g., smartphones, tablets) that do not include a port (e.g., a C-type USB port) for wired communication or a speaker hole that outputs an audio signal are being studied.

SUMMARY

When a speaker hole is not included in an electronic device, an audio signal may be generated by causing a display to vibrate using an actuator that produces vibration. However, the electronic device and the user's body may be in contact during a call. When the electronic device and the user's body come into direct contact, the vibration of the display by the actuator may be reduced, and thus, the sound quality of the audio signal may be degraded.

Various example embodiments of the present disclosure may provide a method and device for reducing the degradation of sound quality and generating an audio signal even when a user's body, or other objects comes in contact with an electronic device.

According to various example embodiments, an electronic device may include a display configured to externally transmit visual information, an actuator configured to cause a vibration of the display, and a processor electrically connected to the actuator and the display, wherein the processor may be configured to apply a pilot signal to the actuator, identify the vibration of the display caused by the actuator using the pilot signal, and set an environment of the audio signal based on the vibration of the display.

According to various example embodiments, an electronic device may include a display configured to render/depict visual information, a first actuator configured to output an audio signal by causing the display to vibrate, a second actuator configured to convert an utterance from a user into a digital signal or cause the display to vibrate to output the audio signal, and a processor electrically connected to the display, the first actuator, and the second actuator, wherein the processor is configured to apply a pilot signal to the first actuator and the second actuator, identify a first vibration of the display caused by the first actuator and a second vibration of the display caused by the second actuator, using the pilot signal, and set an environment of an audio signal output by the first actuator or an environment of an audio signal output by the second actuator, based on the first vibration and the second vibration.

According to various example embodiments, a method of generating an audio signal may include applying a pilot signal to an actuator, identifying a vibration of a display caused by the actuator using the pilot signal, and setting an environment of the audio signal based on the vibration of the display.

According to various example embodiments, a method of generating an audio signal may include applying a pilot signal to a first actuator and a second actuator, identifying a first vibration of a display caused by the first actuator and a second vibration of the display caused by the second actuator using the pilot signal, and setting an environment of an audio signal output by the first actuator or an environment of an audio signal output by the second actuator, based on the first vibration and the second vibration.

According to various example embodiments of the present disclosure, degradation of sound quality may be prevented by determining whether a display and the body of a user are in contact based on an amount/degree of vibration of the display and through low-band reinforcement and gain increase.

According to various example embodiments of the present disclosure, by determining a gripping state of an electronic device, a plurality of actuators may be used to compensate an audio signal or to prevent a voice volume input to a microphone from being attenuated.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 5 is a flowchart illustrating a process of generating an audio signal using a single actuator according to various example embodiments;

FIGS. 6A and 6B are diagrams illustrating gripping states according to various example embodiments.

DETAILED DESCRIPTION

Figure 1:
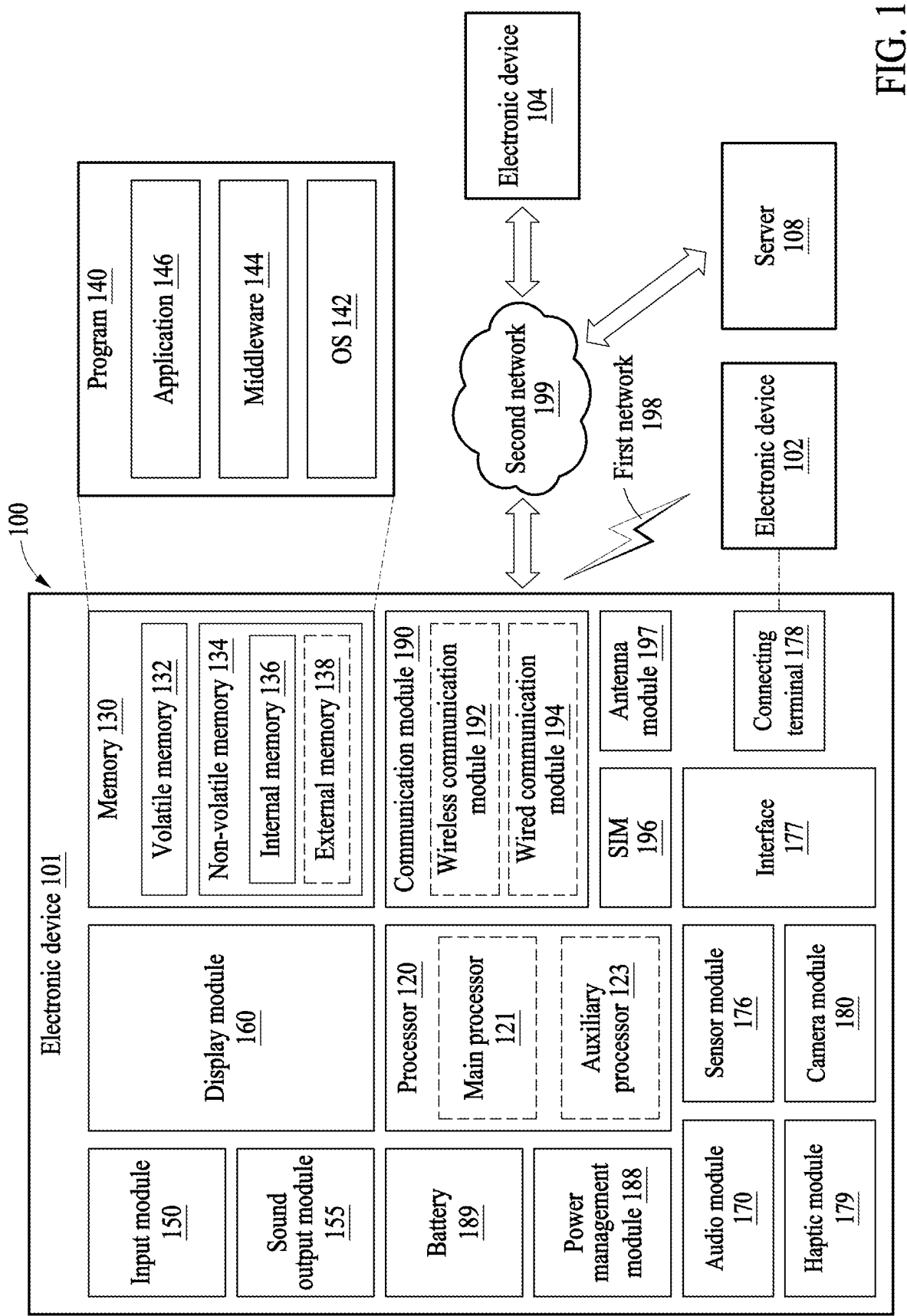
FIG. 1 is a block diagram illustrating an electronic device according to various example embodiments.

Hereinafter, example embodiments will be described in detail with reference to the accompanying drawings. When describing the exemplary embodiments with reference to the accompanying drawings, like reference numerals refer to like elements, and a repeated description related thereto will be omitted.

FIG. 1 is a block diagram illustrating an electronic device 101 in a network environment 100 according to various examples. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added to the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132. The processor 120 may process the command or the data stored in the volatile memory 132 and store the resulting data in a non-volatile memory 134. According to an example embodiment, the processor 120 may include a main processor 121 (e.g., a central processing unit (CPU) or an application processor (AP)). Alternatively, or in addition, the processor 120 may include an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some functions or states related to at least one (e.g., the display module 160, the sensor module 176, or the communication module 190) of the components of the electronic device 101. In some examples, the auxiliary processor 123 may control the functions or states instead of the main processor 121 when the main processor 121 is in an inactive (e.g., sleep) state. Alternatively, or in addition, the auxiliary processor 123 may control the functions or states in conjunction with the main processor 121, which is in an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Examples of learning algorithms may include but are not limited to supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal outside the electronic device 101. The sound output module 155 may include, for example, a speaker or a receiver. The speaker may be used for general purposes, such as playing multimedia or playing records. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch or a pressure sensor adapted to measure the intensity of force incurred by the touch.

The audio module 170 may convert a sound into an electric signal or vice versa.

According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus that a user may recognize via their tactile or kinesthetic sensations. According to an example embodiment, the haptic module 179 may include, for example, a motor, a piezoelectric element, or an electric stimulator.

The camera module 180 may capture still and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell that is not rechargeable, a secondary cell that is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication networks, such as a legacy cellular network, a 5G network, a next-generation communication network, the Internet, or a computer network (e.g., a LAN or a wide area network (WAN)). These various types of communication modules may be implemented as a single component (e.g., a single chip) or as multi-components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beam-forming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element, a conductive material, or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

The antenna module 197 may form a mmWave antenna module according to various example embodiments. According to an example embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each external electronic device 102 or 104 may be a device of the same type as or a different type from the electronic device 101. According to an example embodiment, all or some of operations to be executed by the electronic device 101 may be executed at one or more external electronic devices (e.g., the external devices 102 and 104, and the server 108). For example, if the electronic device 101 needs to perform a function or a service automatically or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, cloud computing, distributed computing, mobile edge computing (MEC), or client-server computing technology may be used. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
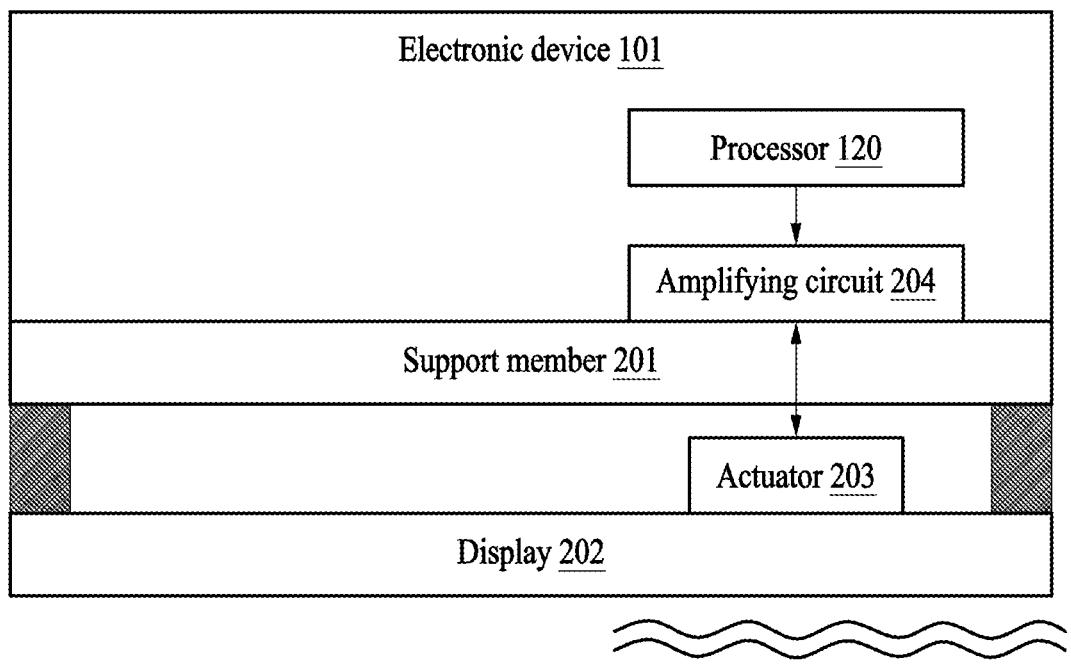
FIG. 2 is a block diagram illustrating an electronic device for generating an audio signal using a single actuator according to various example embodiments.

FIG. 2 is a block diagram illustrating an electronic device for generating an audio signal using a single actuator according to various example embodiments. The audio signal can include speech, music, background audio, tones, or any other sounds or a combination thereof.

According to various example embodiments, the electronic device 101 may further include an actuator 203 that outputs an audio signal by causing a vibration of a display 202, a support member 201 that supports the display 202 and the actuator 203, and an amplifying circuit 204 for amplifying a signal applied to the actuator 203.

According to various example embodiments, the actuator 203 may be a piezoelectric actuator 203 that converts an audio signal or an audio signal into a vibration, or converts the vibration into a digital signal such as an audio signal or an audio signal.

According to various example embodiments, the electronic device 101, which is a portless model, may output an audio signal using the actuator 203. Referring to FIG. 2, the actuator 203 may output an audio signal by generating a vibration in the display 202. Referring to FIG. 2, the actuator 203 may be attached to an inner surface of the display 202. Referring to FIG. 2, the actuator 203 may be attached, on the inner surface of the display 202, to a location that is in contact with the ear of a user when the user grips the electronic device 101.

According to various example embodiments, the electronic device 101 may be a portless electronic device that does not include a speaker hole through which an audio signal or an audio signal is output. The electronic device 101 may not include a speaker hole through which an audio signal or an audio signal is output, or a USB port for wired charging. The electronic device 101 may include a housing that surrounds the outside of the electronic device 101 that does not include a port. In other words, the housing is non-porous (no holes).

According to various example embodiments, when an audio signal is generated using the actuator 203, degradation in sound quality of the audio signal may be prevented by determining whether the display 202 and the user's body are in contact using the vibration of the display 202, or by setting an environment of the audio signal based on a state (e.g., a gripping state, an open state) of the electronic device 101 and generating the audio signal according to the set environment.

Figure 3:
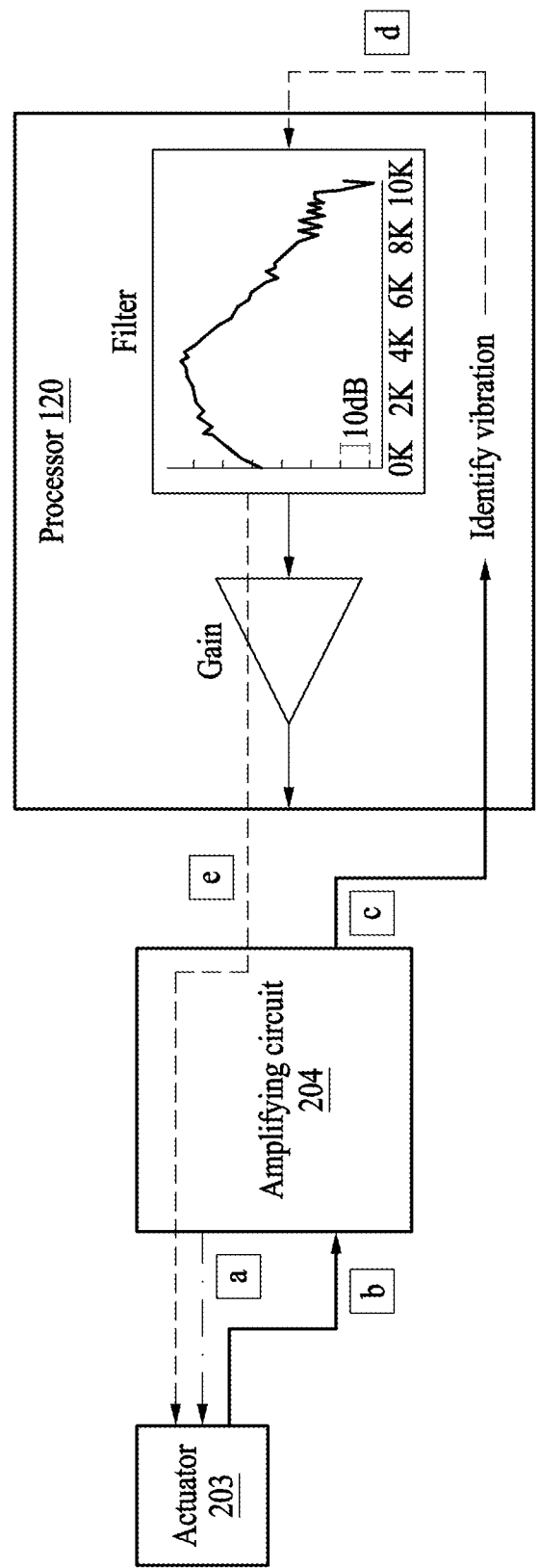
FIG. 3 is a block diagram illustrating a process of generating an audio signal using a single actuator according to various example embodiments.

FIG. 3 is a block diagram illustrating a process of generating an audio signal using a single actuator 203 according to various example embodiments.

FIG. 3 is a block diagram illustrating a process of generating an audio signal in the structure of FIG. 2. In example (a) of FIG. 3, the processor 120 may apply a pilot signal to the actuator 203 through the amplifying circuit 204. According to various example embodiments, the processor 120 may apply the audio signal and pilot signal simultaneously to the actuator 203 via the amplifying circuit 204.

According to various example embodiments, the pilot signal may refer to a pilot tone of an inaudible band. The actuator 203 may output an audio signal by generating a vibration according to the applied signal.

In examples (b) and (c) of FIG. 3, the processor 120 may identify the vibration of the display 202 through the amplifying circuit 204. In example (b) of FIG. 3, the actuator 203 may transmit a feedback signal by the vibration of the display 202 to the amplifying circuit 204. The feedback signal may refer to a feedback signal for the pilot signal.

According to various example embodiments, the processor 120 may determine the vibration of the display 202 by determining a change in impedance of the actuator 203 based on an amplitude level of the feedback signal. When the impedance of the actuator 203 increases, the amplitude level of the feedback signal may be higher than the pilot signal.

According to various example embodiments, when a state of the electronic device 101 is a "gripping state," the user's body is in contact with the electronic device 101, causing the impedance of the actuator 203 to increase. When the state of the electronic device 101 is an "open state" and not the gripping state, because there is no contact with the user's body, the impedance of the actuator 203 may not increase. Because the vibration of the display 202 decreases due to contact with the user, the impedance of the actuator 203 may increase.

According to various example embodiments, the display 202 may include a foldable display or a rollable display that may be bent or unfolded to display information. According to various example embodiments, when the state of the electronic device 101 is a "folded state," the impedance of the actuator 203 may increase due to the contact between the displays 202.

In example (d) of FIG. 3, the processor 120 may set an environment of the audio signal based on the detected vibration of the display 202 based on the change in impedance. The processor 120 may determine the state of the electronic device 101 based on the vibration of the display 202, and may set the environment of the audio signal according to the state of the electronic device 101.

According to various example embodiments, when the amount of vibration of the display 202 is less than a state threshold (which is determined based on the pilot signal), the processor 120 determines the state of the electronic device 101 as the gripping state. The state threshold may be determined based on the pilot signal and may not be limited to a predetermined value.

According to various example embodiments, when the amount of vibration of the display 202 is greater than or equal to the state threshold, the processor 120 determines the state of the electronic device 101 as the open state. The open state may be a state in which the display 202 is not in contact with the user's (or anybody else's) body or another object.

The audio signal may be transmitted using the actuator 203 for reception by the eardrum via a change in air pressure caused by the vibration of the display 202 (e.g., airborne). Alternatively, or in addition, the audio signal is transmitted as a physical force to the user's cochlea in the form of a tremor caused by the vibration of the display 202 (e.g., structure-borne).

According to various example embodiments, when the state of the electronic device 101 is the open state, the processor 120 may enhance a high-band signal of the audio signal by using filtering. In an example embodiment, the processor 120 may perform filtering using an equalizer. The processor 120 may generate an audio signal that enhances the high-band signal by compensating the high-band signal using an equalizer.

When the electronic device 101 is in the open state, the processor 120 may enhance the high-band signal with an amount of vibration that increases airborne transmission, thereby preventing sound quality degradation. According to various example embodiments, the amount of vibration of the display 202 may be determined based on a change in impedance. When a vibration of the display 202 is generated by the audio signal applied to the actuator 203 in the open state, the amount of vibration corresponding to a measured impedance may be determined as the state threshold. When the amount of vibration of the display 202 decreases due to contact with the user's body or another object, the measured impedance may increase. The processor 120 may identify a change in the amount of vibration of the display 202 based on the change in impedance.

According to various example embodiments, when the electronic device 101 is in the gripping state, the processor 120 may enhance the low-band signal from the audio signal or increase a gain of the audio signal. The processor 120 may enhance the low-band signal by using filtering. In an example embodiment, the processor 120 may perform filtering using an equalizer. The processor 120 may generate an audio signal that enhances the low-band signal by compensating for the low-band signal using the equalizer.

When the electronic device 101 is in the gripping state, the processor 120 may enhance the low-band signal with an amount of vibration that increases structure-borne transmission, thereby preventing sound quality degradation.

According to various example embodiments, when the impedance (which is determined using the pilot signal) is higher than a predetermined reference threshold, the processor 120 may enhance the low-band signal of the audio signal or increase the gain of the audio signal. In an example embodiment, the reference threshold may be determined as DC-R. The reference threshold may not be limited to a predetermined value, and may be determined differently in some example embodiments.

Figure 4:
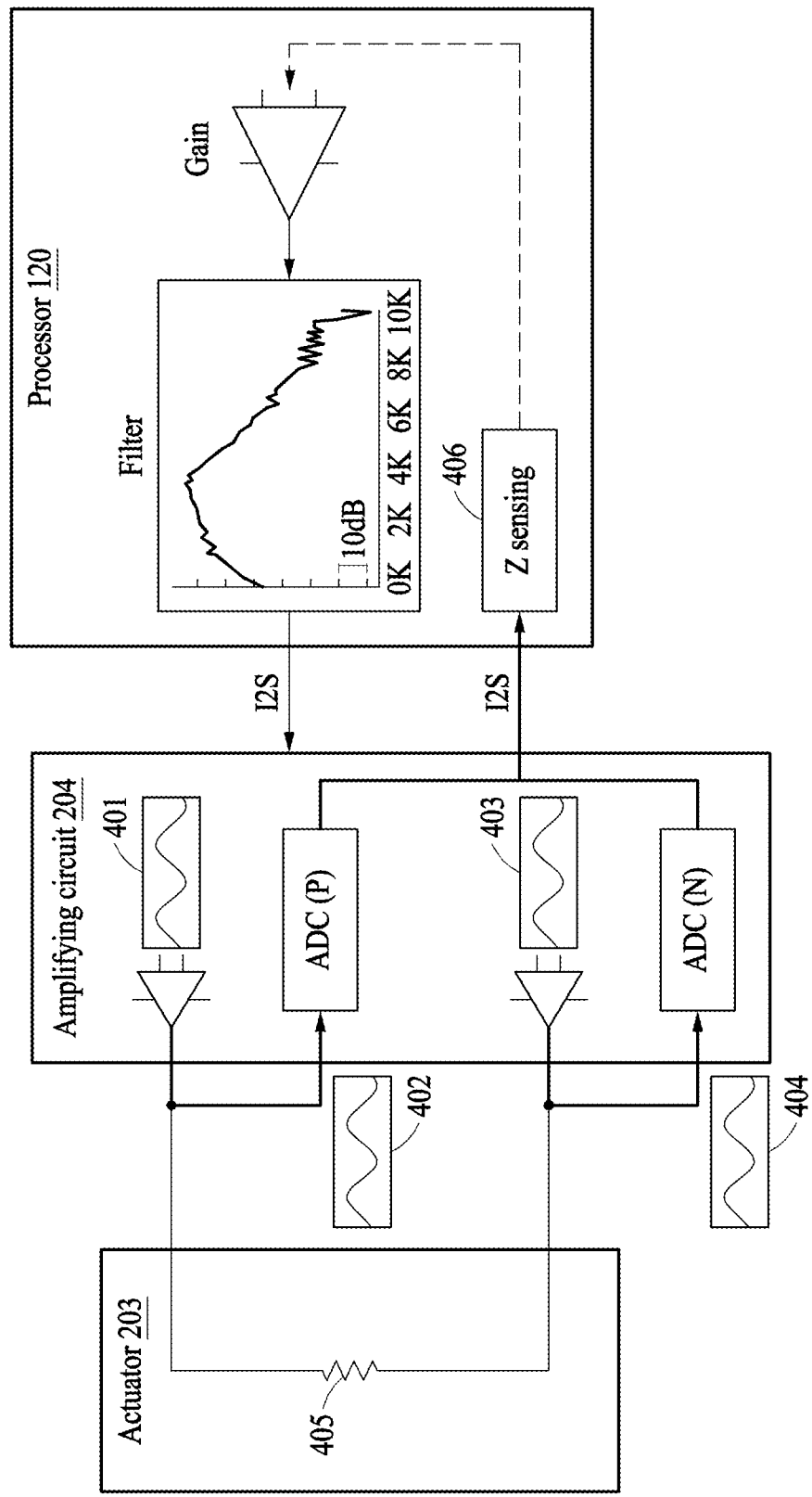
FIG. 4 is a block diagram illustrating a process of generating an audio signal using a single actuator according to various example embodiments.

FIG. 4 is a block diagram illustrating a process of generating an audio signal using a single actuator 203 according to various example embodiments.

In FIG. 4, a pilot signal is expressed as a graph indicating the time and magnitude of vibration. The pilot signal may be transmitted to the actuator 203. The pilot signal may be a tone of an inaudible band (i.e., a sound outside a human-audible range). The pilot signal may include a phase 401 and noise 403. The feedback signal for the pilot signal may include a feedback signal 402 and a feedback signal 404 for the phase 401. The actuator 203 may include load 405.

Referring to FIG. 4, a feedback signal for the pilot signal may be transmitted to the amplifying circuit 204. A vibration of a display 202 may be converted into the feedback signal for the pilot signal by an analog to digital converter (ADC) of the amplifying circuit 204. When the vibration of the display 202 decreases due to contact with the user, an amplitude level of the feedback signal for the pilot signal may increase.

According to various example embodiments, the processor 120 may determine a change in impedance (e.g., a Z sensing 406) based on the amplitude level of the feedback signal for the pilot signal. The processor 120 may compare the impedance with a reference threshold that was previously determined using the pilot signal. When a vibration of the display 202 is generated by applying the pilot signal to the actuator 203 in an open state, a measured impedance may be determined as the reference threshold (e.g., DC-R).

According to various example embodiments, when the impedance is higher than the reference threshold, the processor 120 may increase a gain of an audio signal and enhance a low-band signal from the audio signal by using filtering. When the low-band signal is enhanced while the user is gripping an electronic device 101, an audio signal due to the structure-borne transmission may be enhanced so that an audio signal with high quality is delivered to the user.

FIG. 5 is a flowchart illustrating a process of generating an audio signal using a single actuator according to various example embodiments.

In operation 501, the processor 120 may apply a pilot signal (e.g., 401 and 403 of FIG. 4) to an actuator (e.g., 203 of FIG. 2). The processor 120 may apply the pilot signal to the actuator through an amplifying circuit (e.g., 204 of FIG. 2). According to various example embodiments, the pilot signal may refer to a pilot tone of an inaudible band. The actuator may output an audio signal by generating a vibration corresponding to the applied pilot signal.

In operation 502, the processor 120 may identify a vibration of a display caused by the actuator using the pilot signal. An amount of vibration of the display may be determined based on a change in impedance. When the vibration of the display is generated by the audio signal applied to the actuator in an open state, the amount of vibration corresponding to a measured impedance may be determined as a state threshold.

When the amount of vibration of the display decreases due to contact with a user or another object, the measured impedance may increase. The processor 120 may identify a change in the amount of vibration of the display based on the change in impedance. The processor 120 may determine the change in impedance of the actuator based on the amplitude level of the feedback signal. When the impedance of the actuator increases, the amplitude level of the feedback signal may be higher than that of the pilot signal.

In operation 503, the processor 120 may set an environment of the audio signal based on the vibration of the display. When the impedance is higher than a reference threshold predetermined according to the pilot signal, a low-band signal of the audio signal may be enhanced or a gain of the audio signal may be increased.

According to various example embodiments, the processor 120 may determine a state of the electronic device 101 based on the vibration of the display. The processor 120 may set the environment of the audio signal based on the state determined. When the amount of vibration of the display is less than a state threshold (determined using the pilot signal), the state of the electronic device 101 may be determined as a gripping state. When the electronic device 101 is in the gripping state, the processor 120 may enhance the low-band signal of the audio signal or increase the gain of the audio signal.

FIGS. 6A and 6B are diagrams illustrating gripping states according to various example embodiments.

Example shown in FIG. 6A is a diagram illustrating a first gripping state according to an exemplary embodiment. The first gripping state may be a state in which an ear of a user is in contact with an electronic device 101, and a distance between the mouth of the user and the electronic device 101 is equal to or less than a predetermined distance.

Example shown in FIG. 6B is a diagram illustrating a second gripping state according to an exemplary embodiment. The second gripping state may be a state in which an ear of the user is in contact with the electronic device 101, and the distance between the mouth of the user and the electronic device 101 exceeds the predetermined distance.

Referring to FIGS. 6A and 6B, the electronic device 101 may include an actuator 601 (e.g., the actuator 203 of FIG. 2) for outputting an audio signal and an auxiliary actuator 602 for converting an utterance by the user into an audio signal, or causing a vibration of a display to output a voice signal.

In one or more examples, the actuator 601 may be attached to an inner surface of the display, closer in proximity to a first end of the electronic device 101, the first end being in contact with the user's ear in the gripping state. In one or more examples, the auxiliary actuator 602 may be attached, on the inner surface of the display, closer in proximity to a second end of the electronic device, the second end being closer to the user's mouth when the electronic device 101 is in the gripping state.

According to various example embodiments, the state of the electronic device 101 may include an extreme gripping state. The extreme gripping state may be a state in which the extent of contact between the user's ear and the electronic device 101 is greater than the extent of contact in the first gripping state and/or the second gripping state. The processor 120 may determine that the state of the electronic device 101 is the extreme gripping state when an impedance of the actuator 601 determined based on a feedback signal for the pilot signal is higher than an abnormality threshold (second impedance threshold) which is higher than a reference threshold (first impedance threshold).

When the state of the electronic device 101 is the extreme gripping state, the processor 120 may output an audio signal using the auxiliary actuator 602 as well as the actuator 601. A method of using the auxiliary actuator 602 is described in detail below.

Figure 7:
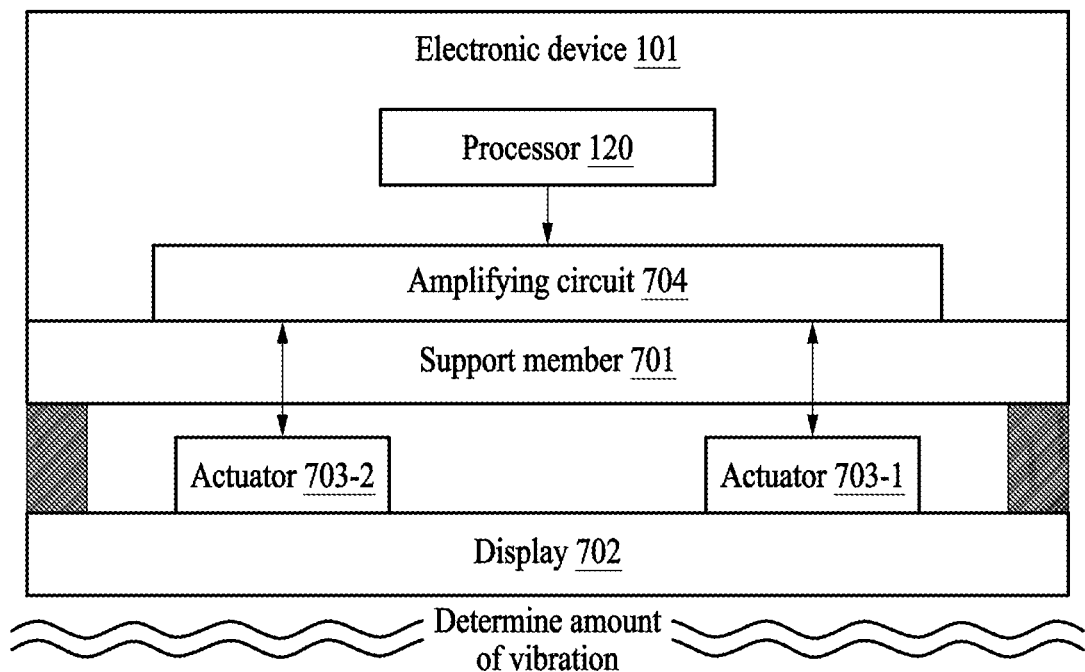
FIG. 7 is a block diagram illustrating an electronic device for generating an audio signal using a plurality of actuators according to various example embodiments.

FIG. 7 is a block diagram illustrating an electronic device 101 for generating an audio signal using a plurality of actuators according to various example embodiments.

According to various example embodiments, the electronic device 101 may include a first actuator 703-1 (e.g., the actuator 203 of FIG. 2) that causes a display 702 to vibrate to output an audio signal. The electronic device 101 further includes a support member 701 (e.g., the support member 201 of FIG. 2) that supports the display 702, the first actuator 703-1 and the second actuator 703-2. The electronic device 101 further includes an amplifying circuit 704 (e.g., the amplifying circuit 204 of FIG. 2) for amplifying a signal applied to the first actuator 703-1 and/or the second actuator 703-2. In some examples, the electronic device 101 further includes a second actuator 703-2 (e.g., the auxiliary actuator 602) that converts an utterance by a user into an audio signal or causes the display 702 to vibrate to output an audio signal.

According to various example embodiments, each of the first actuator 703-1 and the second actuator 703-2 may be a piezoelectric actuator that converts an audio signal or an audio signal into vibration or vibration into a digital signal such as an audio signal or an audio signal.

The first actuator 703-1 may be attached to the inner surface of the display 702. The first actuator 703-1 is attached to a first end of the electronic device 101, the first end being in contact with the user's ear when the device 101 is gripped by the user. The second actuator 703-2 may be attached, on the inner surface of the display 702, at a second end of the electronic device 101, the second end being in contact (or close to) the user's mouth when the electronic device 101 is gripped by the user.

According to various example embodiments, the electronic device 101 may be a portless model that does not include a speaker hole through which an audio signal or an audio signal is output. The electronic device 101 may further not include a port (e.g., a USB port) for wired charging, or output. The electronic device 101 may include a housing that does not include a port and that surrounds the outside of the electronic device 101.

According to various example embodiments, when an audio signal is generated using the actuator, degradation in sound quality of the audio signal may be prevented by determining whether the display 702 and the user's body are in contact using the display's vibration. Alternatively, a state (e.g., a first gripping state, a second gripping state, an extreme gripping state, an open state) of the electronic device 101 is determined and in response, an environment of the electronic device 101 is set. The electronic device 101 generates an output and/or input audio signal according to the set environment.

Figure 8:
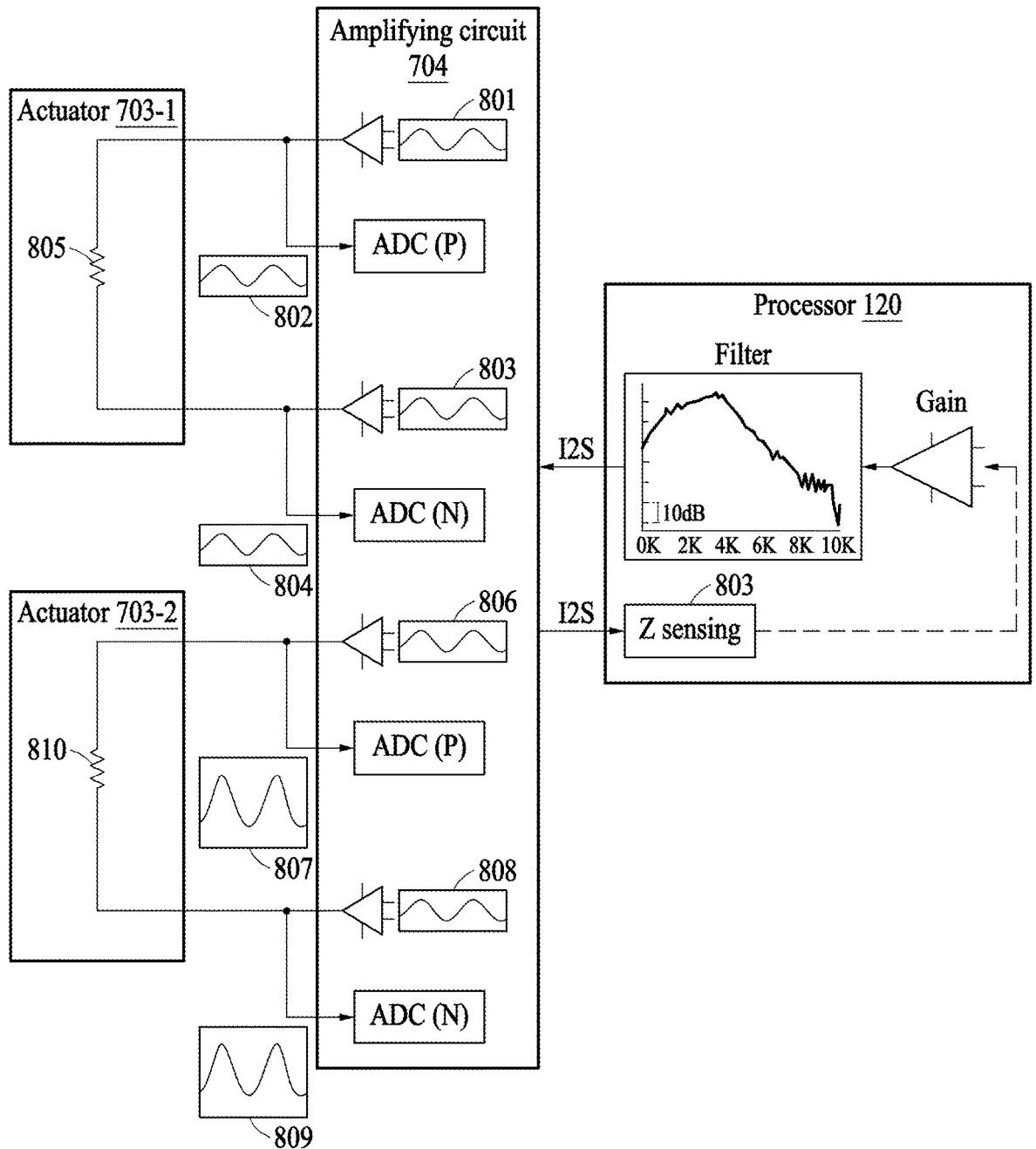
FIG. 8 is a block diagram illustrating a process of generating an audio signal using a plurality of actuators according to various example embodiments.

FIG. 8 is a block diagram illustrating a process of generating an audio signal using a plurality of actuators according to various example embodiments.

FIG. 8 may be a block diagram illustrating a process of generating an audio signal in the structure of FIG. 7. According to various example embodiments, the processor 120 may apply a pilot signal to the first actuator 703-1 and the second actuator 703-2 through the amplifying circuit 704. According to various example embodiments, the processor 120 may apply an audio signal with the pilot signal to the first actuator 703-1 simultaneously through the amplifying circuit 704. The first actuator 703-1 may include load 805, and the second actuator 703-2 may include load 810.

According to various example embodiments, a pilot signal applied to the first actuator 703-1 may include a phase 801 and a noise 803. A pilot signal applied to the second actuator 703-2 may include a phase 806 and a noise 808.

A feedback signal for the pilot signal applied to the first actuator 703-1 may include a feedback signal 802 and a feedback signal 804 for the phase 801. The feedback signal for the pilot signal applied to the second actuator 703-2 may include a feedback signal 807 and a feedback signal 809 for the phase 806.

According to various example embodiments, the processor 120 may identify a first vibration of the display 702 generated by the first actuator 703-1 and a second vibration of the display 702 generated by the second actuator 703-2 using the amplifying circuit 704.

According to various example embodiments, the processor 120 may determine the first vibration by determining a change in impedance (e.g., a Z sensing 803) of the first actuator 703-1 based on an amplitude level of the feedback signal for the pilot signal applied to the first actuator 703-1. According to various example embodiments, the processor 120 may determine the second vibration by determining a change in impedance (e.g., a Z sensing 803) of the second actuator 703-2 based on an amplitude level of the feedback signal for the pilot signal applied to the second actuator 703-2.

As the impedance of the first actuator 703-1 increases, the amplitude level of the feedback signal collected from the first actuator 703-1 exceeds the pilot signal applied to the first actuator 703-1. When the impedance of the second actuator 703-2 increases, the amplitude level of the feedback signal collected from the second actuator 703-2 may be higher than the pilot signal applied to the first actuator 703-1.

According to various example embodiments, the processor 120 may set an environment of an audio signal output by the first actuator 703-1 or an environment of an audio signal received by or output by the second actuator 703-2, based on the first vibration and the second vibration.

According to various example embodiments, the processor 120 may determine a state of the electronic device 101. The processor 120 may use the state of the electronic device 101 to set an environment of an audio signal output by the first actuator 703-1. Alternatively, or in addition, the processor 120 may use the state to set an environment of an audio signal received by or output by the second actuator 703-2. In some cases, the first actuator 703-1 uses a first environment, and the second actuator 703-2 uses a second environment, which may be distinct from the first environment.

The state of the electronic device 101 may be any one of: open state, first gripping state (e.g., FIG. 6A), second gripping state (e.g., FIG. 6B), and extreme gripping state. In the case of the first gripping state, both the first actuator 703-1 and the second actuator 703-2 are in contact or are within a predetermined distance of a user. Hence, a difference between the first vibration and the second vibration does not exceed a threshold value.

According to various example embodiments, when the difference between the first vibration and the second vibration is smaller than the state threshold (determined using the pilot signal), the processor 120 may deem the electronic device 101 to be in the first gripping state. The state threshold may be preset and may be determined differently in example embodiments.

According to various example embodiments, when the display 702 is vibrated by applying a pilot signal to the first actuator 703-1 and to the second actuator 703-2 in the first gripping state, the state threshold may be determined as an amount of vibration corresponding to a difference between an impedance based on the feedback signal of the first actuator 703-1 and an impedance based on the feedback signal of the second actuator 703-2.

According to various example embodiments, when the electronic device 101 is in the first gripping state, the processor 120 may enhance a low-band signal of an audio signal output by the first actuator 703-1 or increase a gain of the audio signal output by the first actuator 703-1.

In the case of the second gripping state, a distance between the user's mouth and the electronic device 101 exceeds a predetermined distance. Hence, recognition of an utterance by the user may be degraded. According to various example embodiments, when the difference between the first vibration and the second vibration is greater than the state threshold (determined according to the pilot signal), the processor 120 may deem the electronic device 101 as being in the second gripping state.

According to various example embodiments, the difference between the first vibration and the second vibration may refer to a difference between an amount of the first vibration and an amount of the second vibration. In the case of the second gripping state, although the impedance of the first actuator 703-1 increases due to contact with the user, because the second actuator 703-2 exceeds a predetermined distance from the user, the impedance may match the impedance of the open state. As the difference between the amount of the first vibration and the amount of the second vibration increases, the second actuator 703-2 and the user's body (e.g., the mouth) move further away from each other. Hence, a difference may also increase between the impedances of the first actuator 703-1 and the second actuator 703-2.

According to various example embodiments, when the state of the electronic device 101 is the second gripping state, the processor 120 may increase a gain of a digital signal for an utterance of the user collected from the second actuator 703-2 to prevent a speech volume of the user from being attenuated. When the state of the electronic device 101 is the second gripping state, the processor 120 may enhance the low-band signal of the audio signal output by the first actuator 703-1 or increase the gain of the audio signal output by the first actuator 703-1.

According to various example embodiments, when the state of the electronic device 101 is the open state and not the gripping state (there is no contact with the user's body), the impedance of the actuator may not increase. As the vibration of the display 702 decreases due to contact, the impedance of the actuator may increase.

According to various example embodiments, when the state of the electronic device 101 is the open state, the processor 120 may enhance a high-band signal of the audio signal by using filtering. In an example embodiment, the processor 120 may perform filtering using an equalizer. The processor 120 may generate an audio signal by enhancing the high-band signal using an equalizer.

According to various example embodiments, when the impedance corresponding to the amount of vibration of the display 702 caused by the first actuator 703-1 exceeds an abnormality threshold (which is higher than the impedance corresponding to the state threshold), the processor 120 may deem the electronic device 101 to be in the extreme gripping state. When the electronic device 101 is in the extreme gripping state, the processor 120 may output an audio signal using the second actuator 703-2 and the first actuator 703-1.

According to various example embodiments, the processor 120 may determine a change in impedance of the first actuator 703-1 based on an amplitude level of the feedback signal for the pilot signal applied to the first actuator 703-1. According to various example embodiments, when the impedance of the first actuator 703-1 increases above a reference threshold (determined using the pilot signal applied to the first actuator 703-1), the processor 120 may enhance the low-band signal of the audio signal output by the first actuator 703-1 or increase the gain of the audio signal.

According to various example embodiments, when a vibration of the display 702 is generated by the pilot signal applied to the actuator in the open state, a measured impedance may be determined as the reference threshold (e.g., DC-R).

According to various example embodiments, when the impedance of the first actuator 703-1 is higher than the abnormality threshold, which is higher than the reference threshold, the processor 120 may output an audio signal using the second actuator 703-2. The abnormality threshold may be predetermined to prevent degradation of the quality of the audio signal due to increased body contact.

According to various example embodiments, when the difference between the impedance of the first actuator 703-1 and the impedance of the second actuator 703-2 is greater than or equal to a preset difference threshold, the processor 120 may increase the gain of the digital signal collected to represent the user's utterance(s). The difference between the impedances of the first actuator 703-1 and the second actuator 703-2 may indicate the difference between the amounts of vibration, and vice versa. In turn, the difference in the impedance (and/or vibration) indicates that the second actuator 703-2 and the user's body (e.g., the mouth) are further apart from each other. When the difference between the amount of the vibrations increases, the difference between the impedances of the first actuator 703-1 and the second actuator 703-2 also increases in some example embodiments.

According to various example embodiments, when the electronic device 101 is in the second gripping state, the processor 120 may increase a gain of a digital signal representing the user's utterance, which is captured by the second actuator 703-2. The increase in gain is to prevent volume of the user's speech from being attenuated, i.e., preventing quality of the audio from being degraded.

Figure 9:
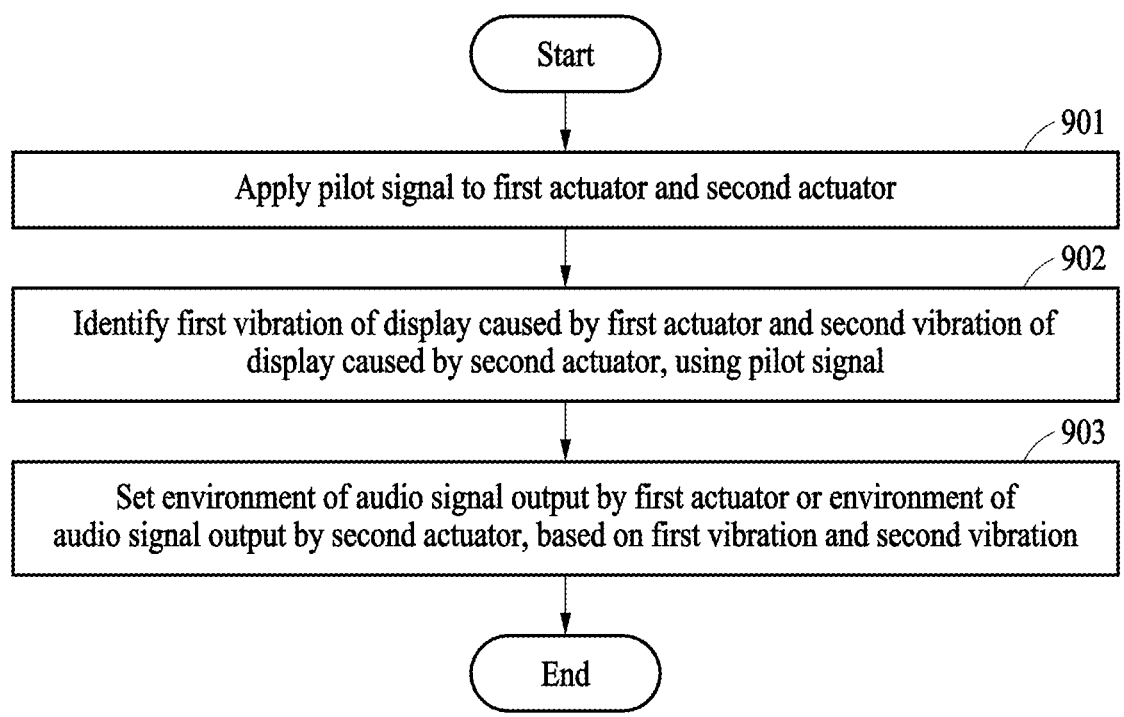
FIG. 9 is a flowchart illustrating a process of generating an audio signal using a single actuator according to various example embodiments.

FIG. 9 is a flowchart illustrating a process of generating an audio signal using a single actuator according to various example embodiments.

In operation 901, the processor 120 may apply a pilot signal (e.g., 801, 803, 806, 808 of FIG. 8) to a first actuator (e.g., 703-1 of FIG. 7) and a second actuator (e.g., 703-2 of FIG. 7). According to various example embodiments, the processor 120 may apply an audio signal with the pilot signal to the first actuator simultaneously through an amplifying circuit.

In operation 902, the processor 120 may identify a first vibration of a display caused by the first actuator and a second vibration of the display caused by the second actuator, using the pilot signal.

According to various example embodiments, the processor 120 may determine the first vibration by determining a change in impedance (e.g., the Z sensing 803) of the first actuator based on an amplitude level of a feedback signal for the pilot signal applied to the first actuator.

According to various example embodiments, the processor 120 may determine the second vibration by determining a change in impedance (e.g., the Z sensing 803) of the second actuator based on an amplitude level of a feedback signal for the pilot signal applied to the second actuator.

In operation 903, the processor 120 may set an environment of an audio signal output by the first actuator or an environment of an audio signal output by or received by the second actuator, based on the first vibration and the second vibration.

According to various example embodiments, when an impedance of the first actuator is higher than an abnormality threshold which is higher than a reference threshold, the processor 120 may output an audio signal using the second actuator.

According to various example embodiments, when a difference between the impedance of the first actuator and an impedance of the second actuator is greater than or equal to a preset difference threshold, the processor 120 may increase a gain of a digital signal collected due to an utterance of a user.

According to various example embodiments, an electronic device 101 may include a display (e.g., the display 201 of FIG. 2) configured to render/depict visual information to a user of the electronic device 101. The electronic device 101 further includes an actuator (e.g., the actuator 203 of FIG. 2) configured to cause the display to vibrate. The electronic device 101 further includes a processor 120 electrically connected to the actuator and the display. The processor 120 may be configured to apply a pilot signal (e.g., 401, 403 of FIG. 4) to the actuator, identify the vibration of the display caused by the actuator using the pilot signal, and set an environment of the audio signal based on the display's vibration.

The electronic device 101 may further include a housing that does not have any speaker hole through which an audio signal or an audio signal can be output. In one or more examples, the housing surrounds the outside of the electronic device 101.

The processor 120 may determine a state of the electronic device 101 by using the vibration of the display, and may set the environment of the audio signal according to the state of the electronic device 101.

When the detected amount of vibration of the display is less than a state threshold predetermined according to the pilot signal, the processor 120 may determine the state of the electronic device 101 as a gripping state.

When the state of the electronic device 101 is the gripping state, the processor 120 may enhance a low-band signal of the audio signal or increase a gain of the audio signal.

When the detected amount of vibration of the display is greater than or equal to the state threshold predetermined according to the pilot signal, the processor 120 may determine the state of the electronic device 101 as an open state.

The processor 120 may determine the vibration of the display by determining a change in impedance of the actuator based on an amplitude level of a feedback signal (e.g., 402, 404 of FIG. 4) for the pilot signal.

When the impedance is higher than a reference threshold predetermined according to the pilot signal, the processor 120 may enhance a low-band signal of the audio signal or increase a gain of the audio signal.

The electronic device 101 may further include an auxiliary actuator that converts an utterance of a user into an audio signal or causes the display to vibrate to output an audio signal. The processor 120 may apply the audio signal to the auxiliary actuator when the impedance is higher than an abnormality threshold (a separate threshold that is higher than the reference threshold).

The display may be bent or unfolded to display the information.

According to various example embodiments, an electronic device 101 may include a display (e.g., 702 of FIG. 7) that renders/depicts visual information to the user of the electronic device 101. The electronic device 101 further includes a first actuator (e.g., 703-1 of FIG. 7) that outputs an audio signal by vibrating the display. The electronic device 101 further includes a second actuator (e.g., 703-2 of FIG. 7) that converts an utterance by the user into a digital signal or causes the display to vibrate to output the audio signal. The electronic device 101 further includes a processor 120 electrically connected to the display, the first actuator, and the second actuator. In one or more example embodiments, the processor 120 applies a pilot signal (e.g., 801, 803, 806, 808 of FIG. 8) to the first actuator and the second actuator. The processor 120 further facilitates identifying a first vibration of the display caused by the first actuator and a second vibration of the display caused by the second actuator, using the pilot signal. The processor 120 may also set an environment of an audio signal output by the first actuator or an environment of an audio signal output by the second actuator, based on the first vibration and the second vibration.

The electronic device 101 may further include a housing that does not have a speaker hole through which an audio signal or an audio signal is output and surrounds the outside of the electronic device 101.

The processor 120 may determine the state of the electronic device 101 based on the first vibration and the second vibration. The processor 120 may set the environment of the audio signal output by the first actuator or the environment of the audio signal output by the second actuator according to the state of the electronic device 101.

In response to the difference between the first vibration and the second vibration being smaller than a state threshold (determined using the pilot signal), the processor 120 may deem the electronic device 101 to be in the first gripping state.

When the electronic device 101 is in the first gripping state, the processor 120 may enhance a low-band signal of an audio signal output by the first actuator or increase a gain of the audio signal output by the first actuator.

In response to the difference between the first and second vibrations being greater than a state threshold (determined using the pilot signal), processor 120 may deem the electronic device 101 to be in the second gripping state.

The processor 120 may increase a gain of a digital signal representing the user's utterance when the state of the electronic device 101 is the second gripping state.

The processor 120 may determine the first vibration by determining a change in impedance of the first actuator based on an amplitude level of a feedback signal (e.g., 802, 804, 807, 809 of FIG. 8) for the pilot signal applied to the first actuator.

The processor 120 may enhance the low-band signal of the audio signal output by the first actuator or increase the gain of the audio signal when the impedance of the first actuator increases above a reference threshold. In some examples, the reference threshold is dynamically determined using the pilot signal, for example, applying the pilot signal to the first actuator.

The processor 120 may output an audio signal using the second actuator when the impedance of the first actuator is higher than an abnormality threshold which is higher than the reference threshold.

The processor 120 may determine the second vibration by determining a change in impedance of the second actuator based on an amplitude level of a feedback signal for the pilot signal applied to the second actuator.

The processor 120 may increase a gain of a digital signal, which is captured as the representation of the user's utterance, when a difference between the impedance of the first actuator and the impedance of the second actuator is greater than or equal to a preset difference threshold.

According to various example embodiments, a method of generating an audio signal may include applying a pilot signal to an actuator and detecting/identifying a corresponding amount of vibration of a display caused. Further, the method includes setting an environment of the audio signal based on the display's vibration.

According to various example embodiments, a method of generating an audio signal may include applying a pilot signal to a first actuator and a second actuator, identifying a first vibration of a display caused by the first actuator and a second vibration of the display caused by the second actuator because of the pilot signal. The method further includes setting an environment of an audio signal output by the first actuator based on the first vibration. The method further includes setting an environment of an audio signal output by the second actuator based on the second vibration.

According to various example embodiments, the electronic device may be one of the various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be understood that various exemplary embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B," "at least one of A and B," "at least one of A or B," "A, B or C," "at least one of A, B, and C," and "A, B, or C," may include any one of the items listed together in the corresponding one of the phrases, or all possible combinations thereof. Terms such as "first," "second," or "first, or second" may simply be used to distinguish the component from other components in question and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wired), wirelessly, or via a third element.

As used in connection with various example embodiments of the disclosure, the term "module" may include a unit implemented in hardware, software, or firmware and may interchangeably be used with other terms, for example, "logic," "logic block," "part," or "circuitry." A module may be a single integral component or a minimum unit or part thereof, adapted to perform one or more functions. For example, according to an example embodiment, the module may be implemented in the form of an application-specific integrated circuit (ASIC).

Various example embodiments as set forth herein may be implemented as software (e.g., the program 140), including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. One or more instructions may include a code generated by a compiler or a code executable by an interpreter. The machine-readable storage medium may be provided in the form of a non-transitory storage medium. Here, the term "non-transitory" simply means that the storage medium is a tangible device and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)) or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities. Some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
a display configured to display visual information;
an actuator configured to output an audio signal by causing the display to vibrate; and
a processor electrically connected to the actuator and the display, wherein the processor is configured to:
apply a pilot signal to the actuator;
determine an amount of vibration of the display in response to applying the pilot signal to the actuator; and
set an environment of the audio signal based on the detected amount of vibration of the display.

2. The electronic device of claim 1, further comprising a housing that surrounds the outside of the electronic device, the housing being non-porous.

3. The electronic device of claim 1, wherein the processor is configured to:
determine a state of the electronic device based on the vibration of the display and set the environment of the audio signal according to the state of the electronic device.

4. The electronic device of claim 3, wherein the processor is configured to:
determine the state of the electronic device as a gripping state in response to the amount of the vibration of the display being less than a state threshold, the state threshold is dynamically determined using the pilot signal.

5. The electronic device of claim 4, wherein the processor is configured to:
enhance a low-band signal of the audio signal or increase a gain of the audio signal in response to the state of the electronic device being the gripping state.

6. The electronic device of claim 3, wherein the processor is configured to:
determine the state of the electronic device as an open state in response to the amount of the vibration of the display being greater than or equal to a state threshold, the state threshold is dynamically determined using the pilot signal.

7. The electronic device of claim 1, wherein the processor is configured to:
determine the vibration of the display by determining a change in impedance of the actuator based on an amplitude level of a feedback signal for the pilot signal.

8. The electronic device of claim 7, wherein the processor is configured to:
enhance a low-band signal of the audio signal or increase a gain of the audio signal in response to the impedance being higher than a reference threshold, the reference threshold is dynamically determined using the pilot signal.

9. The electronic device of claim 8, further comprising an auxiliary actuator configured to convert an utterance from a user into the audio signal or generate the vibration of the display to output the audio signal, and wherein the processor is further configured to:
apply the audio signal to the auxiliary actuator in response to the impedance being higher than an abnormality threshold which is higher than the reference threshold.

10. The electronic device of claim 1, wherein the display is bent or unfolded to display the visual information.

11. An electronic device, comprising:
a display configured to depict visual information;
a first actuator configured to output an audio signal by causing the display to vibrate;
a second actuator configured to convert an utterance from a user into a digital signal or cause the display to vibrate to output the audio signal; and a processor electrically connected to the display, the first actuator, and the second actuator, wherein the processor is configured to:
  apply a pilot signal to the first actuator, and to the second actuator;
  identify a first vibration of the display caused by the first actuator, and identify a second vibration of the display caused by the second actuator, in response to applying the pilot signal; and
  set a first environment of the audio signal output by the first actuator or a second environment of the audio signal output by the second actuator, based on the first vibration and the second vibration.

12. The electronic device of claim 11, wherein the electronic device further comprises a housing that surrounds the outside of the electronic device, the housing is non-porous.

13. The electronic device of claim 11, wherein the processor is configured to:
  determine a state of the electronic device based on the first vibration and the second vibration, and set the first environment of the audio signal output by the first actuator or the second environment of the audio signal output by the second actuator, according to the state of the electronic device.

14. The electronic device of claim 13, wherein the processor is configured to:
  determine the state of the electronic device as a first gripping state in response to a difference between the first vibration and the second vibration being smaller than a state threshold.

15. The electronic device of claim 13, wherein the processor is configured to:
  determine the state of the electronic device as a second gripping state in response to the difference between the first vibration and the second vibration being greater than a state threshold.

16. The electronic device of claim 15, wherein the processor is configured to:
  increase a gain of the digital signal corresponding to the utterance from the user in response to the state of the electronic device being the second gripping state.

17. The electronic device of claim 11, wherein the processor is configured to:
  determine the first vibration by determining a change in impedance of the first actuator based on an amplitude level of a feedback signal for the pilot signal applied to the first actuator.

18. The electronic device of claim 17, wherein the processor is configured to:
  determine the second vibration by determining a change in impedance of the second actuator based on an amplitude level of a feedback signal for the pilot signal applied to the second actuator.

19. The electronic device of claim 18, wherein the processor is configured to:
  increase a gain of the digital signal collected due to the utterance from the user in response to a difference between the impedance of the first actuator and the impedance of the second actuator being greater than or equal to a preset difference threshold.

20. A computer-implemented method of generating an audio signal, the method comprising:
  applying a pilot signal to an actuator of an electronic device;
  identifying a vibration of a display of the electronic device caused in response to applying the pilot signal to the actuator; and
  setting an environment of the audio signal based on the vibration of the display.

* * * * *